United States Patent [19]

Linkous

[11] 4,253,738
[45] Mar. 3, 1981

[54] TRACTOR-TRAILER MIRROR DEVICE

[76] Inventor: Clifford G. Linkous, 818 Perdue St., Martinsville, Va. 24112

[21] Appl. No.: 120,700

[22] Filed: Feb. 11, 1980

[51] Int. Cl.³ .............................................. G02B 7/18
[52] U.S. Cl. .................................. 350/304; 248/480; 248/486
[58] Field of Search ............... 350/304, 303, 299, 307, 350/302; 248/479, 480, 486, 476

[56] References Cited

U.S. PATENT DOCUMENTS

| 92,966 | 7/1869 | Hennig | 350/304 |
|---|---|---|---|
| 1,426,010 | 8/1922 | Rees | 350/303 |
| 1,562,335 | 11/1975 | Jones | 350/304 |
| 2,514,989 | 7/1950 | Buren | 350/303 |
| 2,708,086 | 5/1955 | Prutzman | 350/304 |
| 3,252,377 | 5/1966 | Kentes | 350/303 |
| 3,797,920 | 3/1974 | Beach | 350/303 |
| 3,977,774 | 8/1976 | O'Sullivan | 350/304 |
| 4,025,173 | 5/1977 | Schmaedeke | 350/304 |
| 4,156,557 | 5/1979 | Skewis | 350/307 |

FOREIGN PATENT DOCUMENTS 202969 10/1980 Fed. Rep. of Germany .......... 350/304

Primary Examiner—Jon W. Henry

[57] ABSTRACT

Pivotable side-by-side mirror members assist the driver of a tractor-trailer or other vehicles in backing and having an unobstructed rear view. The mirror apparatus includes a transverse frame member which allows for a greater and more precise adjustment of the mirror members to each other and to the vehicle for a more complete rearward view.

6 Claims, 4 Drawing Figures

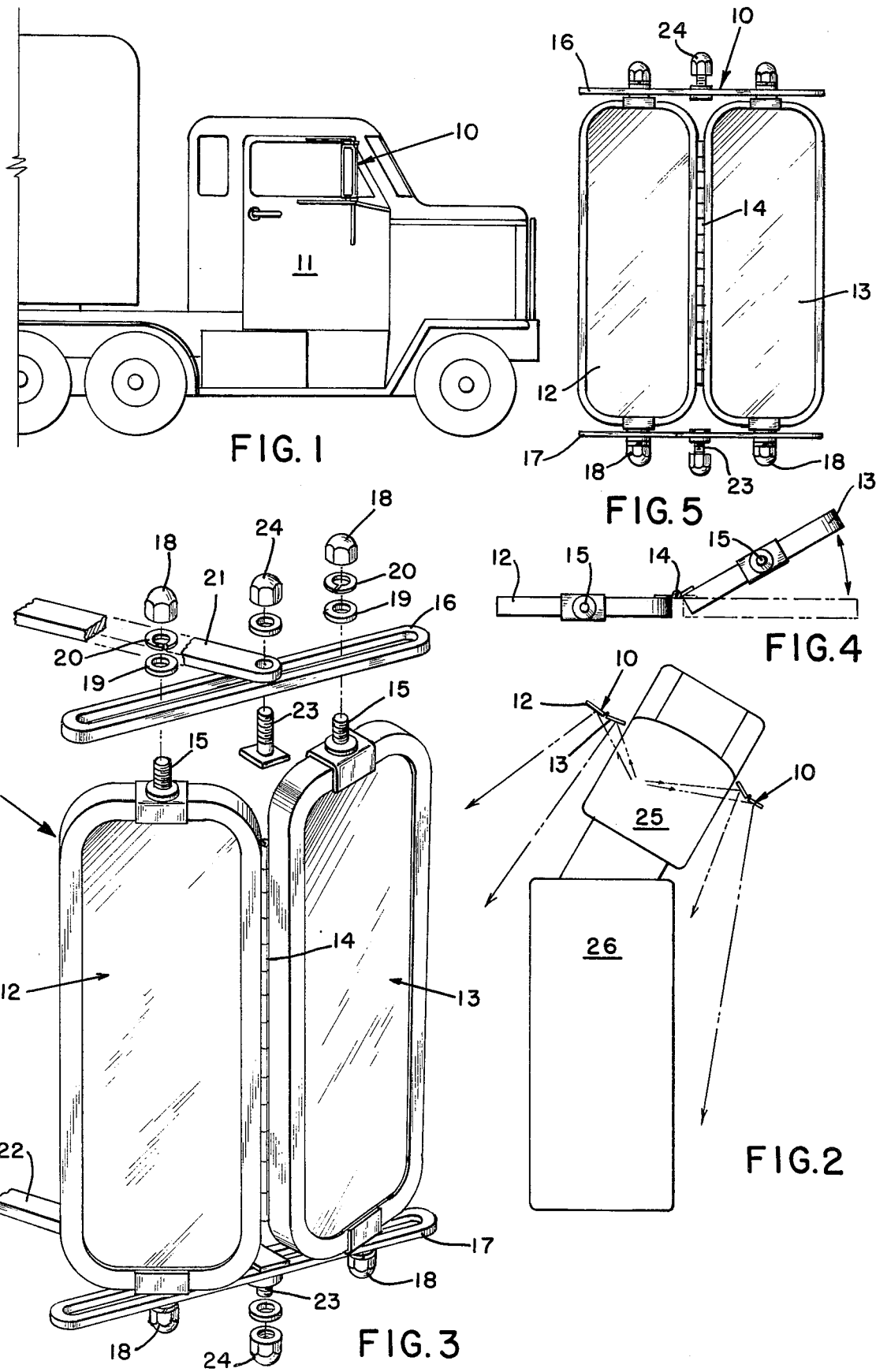

1

TRACTOR-TRAILER MIRROR DEVICE

BACKGROUND AND OBJECTIVES OF THE INVENTION

The backing of tractor-trailer rigs and other large vehicles has long posed a problem for the drivers in that articulated vehicles when turning block the driver's view even though most tractors or cabs are equipped with conventional side-view mirrors. In order to overcome this problem, dual mirror systems have been employed in the past which provide a better view during turning and backing than singular mirror systems.

However, dual mirrors that are commonly utilized are difficult to correctly adjust due to their limited adjustment features and blind spots can occur between the fields of vision of the two mirrors.

With this background in mind the present invention was developed and one of its main objectives is to provide a dual mirror assembly having a transverse frame member which allows an infinite variety of wide angle views and mirror positions.

It is another objective of the present invention to provide a mirror apparatus which is relatively simple in construction and is easily adapted to conventional mirror supports.

It is still another objective of the present invention to provide a mirror apparatus which can be used on a variety of articulated vehicles of varying trailer lengths and heights.

SUMMARY OF THE INVENTION AND DESCRIPTION OF THE DRAWINGS

The present invention consists of a pair of rotatable planar mirror members which are mounted in a side-by-side relationship to a transverse frame member. The frame member in turn is adjustably affixed to a vehicle side mirror support member. The transverse frame member allows the mirror members to be positioned at a desirable angle relative to each other and also allows the mirror members to be simultaneously pivotably adjusted relative to the vehicle at a desired position laterally along the transverse frame member.

Turning now to the drawings,

FIG. 1 illustrates a typical tractor-trailer with the present invention mounted thereon;

FIG. 2 demonstrates the viewing field of the mirror apparatus of a tractor-trailer installation;

FIG. 3 is a partially disassembled view of the preferred embodiment of the invention;

FIG. 4 is a top view of the mirror apparatus demonstrating the pivotable movement of the two mirror members; and FIG. 5 is a front elevational view of the mirror members.

For a more detailed description of the drawings, in FIG. 2 mirror apparatus 10 is shown mounted on each side of tractor 11 and includes side-by-side mirror members 12 and 13 (seen in detail in FIG. 5) which have been suitably adjusted for the driver as explained below in more detail.

In the preferred embodiment of FIG. 3 mirror apparatus 10 includes side-by-side mirror members 12 and 13 which are pivotably joined by hinge means 14 which allows the required angular disposition of the mirror members relative to each other. Top stud means 15 attached to mirror members 12 and 13 are threaded in this embodiment and when assembly is complete penetrate top transverse frame member 16 which is slotted for ease in lateral adjustment of the mirror assembly. The lateral and relative angular disposition movement of the mirror members 12 and 13 is fixed by firmly tightening the hex nuts 18 onto the stud members 15 with washers 19 and lock washers 20 positioned above transverse frame member 16. The bottom stud means are not shown disassembled but function in the same manner as the top stud means 15. Upper vehicle support means 21 and lower vehicle support means 22 are also shown in FIG. 3. Support means 21 and 22 are rotatably attached respectively to upper transverse frame member 16 and lower transverse frame member 17 by retaining studs 23. Of course retaining bolts 23 can be moved laterally along within the slotted transverse frame members as required and at the desired positioning of the vehicle support means 21 and 22, hex nuts 24 are tightened to fix the proper angular relationship between transverse frame members 16 and 17 and support means 21 and 22 respectively.

In FIG. 2 each side of tractor 25 includes mirror assembly 10 which provides the tractor driver with the desired rear viewing field. The angular disposition of the mirror members 12 and 13 relative to each other may be as shown in FIG. 4 or may be at a greater or lesser angle depending upon the length and width of trailer 26 as shown in FIG. 2.

A greater accuracy in adjustment and a more complete viewing field is possible with the present invention since mirror members 12 and 13 are angularly pivotable relative to each other and are laterally within the slotted transverse frame members 16 and 17 as shown in FIG. 3 while support means 21 and 22 are both angularly adjustable relative to transverse frame members 16 and 17 and are also laterally positionable therealong. As shown in FIG. 3 the support means 21 and 22 are located between stud members 15 but if desired may be positioned respectively along transverse frame members 16 and 17 outside of stud members 15.

The examples and illustrations shown herein are for demonstrating particulars of the present invention and are not intended to limit its scope.

I claim:

1. Mirror apparatus for mounting on the side of a cab of an articulated vehicle comprising: horizontal support means for attachment to a vehicle, a transverse frame member rotatable and slidably attached to said support means, a mirror assembly having two side-by-side mirror members, said mirror members being pivotable relative to each other and said mirror assembly being slidably affixed to said transverse member.

2. Mirror apparatus as claimed in claim 1 wherein said transverse frame member is slotted.

3. Mirror apparatus as claimed in claim 1 wherein said mirror member includes stud means.

4. Mirror apparatus as claimed in claim 3 wherein said stud means penetrates said transverse frame member for adjustable attachment thereto.

5. Mirror apparatus as claimed in claim 1 wherein said mirror members are hingedly joined to each other.

6. Mirror apparatus as claimed in claim 1 wherein said transverse frame member comprises first and second sliding members, said first member being positioned above said mirror assembly and said second member being positioned below said mirror assembly and said horizontal support means comprising upper and lower support means.

* * * * *